Patented Jan. 29, 1935

1,989,566

UNITED STATES PATENT OFFICE 1,989,566

PREPARATION OF STABLE SUPERSATURATED CALCIUM GLUCONATE SOLUTIONS

Arthur Stoll and Ernst Burckhardt, Basel, Switzerland, assignors to the firm Chemical Works formerly Sandoz, Basel, Switzerland No Drawing. Application October 8, 1931, Serial No. 567,752. In Germany October 14, 1930

2 Claims. (Cl. 167—68)

The present invention relates to the preparation of stable supersaturated solutions of calcium gluconate.

In the U. S. Patent No. 1,865,141, dated June 28, 1932, Patent No. 1,904,257, dated April 18, 1933 and the co-pending U. S. patent application Ser. No. 522,520 filed March 13, 1931, processes for the preparation of stable supersaturated, therapeutically useful calcium gluconate solutions or of their mixtures with other compounds are described.

In further development of these processes it has been found that the crystallization of calcium gluconate from its supersaturated aqueous solutions can be extraordinarily retarded by adding thereto suitable quantities of calcium salts of the monocarboxylic acids deriving from polyaldoses, such as the calcium salt of the lactobionic- or of the maltobionic acid or mixtures of such salts.

The advantages realized by the present process can easily be illustrated by the following comparative tests.

A hot 10% aqueous solution of calcium gluconate is prepared and allowed to cool down. Such a solution remains a certain time clear when not shaken or inoculated. By adding thereto a small crystal of calcium gluconate the crystallization of the dissolved salt begins immediately and after a short time the whole solution is filled with crystals, whereby only 3.4% of calcium gluconate remain dissolved.

But if to such an aqueous solution containing 10% of calcium gluconate has been added before, during or after its preparation, a certain amount of for example calcium-lactobionate, such a solution remains clear in closed containers a very long time. When inoculated with a crystal of calcium gluconate, the crystallization of the salt takes place very slowly.

Such a behaviour could in so far not have been expected, as the solubility of calcium gluconate in solutions of for example calcium lactobionate is not greatly increased. The following test carried out by shaking during 4 hours 10 g. of calcium gluconate with 100 cc. of an aqueous solution of calcium lactobionate at a normal temperature and filtering the solution of the excess of calcium gluconate, have given the following values for the solubility of the salt at 21° C.

A calcium lactobionate solution of 1% dissolves 3.74% of calcium gluconate.

A calcium lactobionate solution of 2% dissolves 3.81% of calcium gluconate.

A calcium lactobionate solution of 3% dissolves 3.90% of calcium gluconate.

A calcium lactobionate solution of 4% dissolves 4.07% of calcium gluconate.

A calcium lactobionate solution of 5% dissolves 4.16% of calcium gluconate.

A calcium lactobionate solution of 10% dissolves 4.51% of calcium gluconate.

A calcium lactobionate solution of 20% dissolves 5.13% of calcium gluconate.

A calcium lactobionate solution of 30% dissolves 5.42% of calcium gluconate.

A calcium lactobionate solution of 50% dissolves 5.53% of calcium gluconate.

But if 10 g. of calcium gluconate are dissolved at an elevated temperature by its heating in 100 cc. of an aqueous calcium lactobionate solution and after cooling down inoculated with a crystal of calcium gluconate, a much greater quantity of this salt remains dissolved. After 10 days the solutions contained the following quantities of calcium gluconate:

In a solution in pure water remain dissolved 3.4% of calcium gluconate.

In a calcium lactobionate solution of 1% remain dissolved 6.4% of calcium gluconate.

In a calcium lactobionate solution of 2% remain dissolved 9.12% of calcium gluconate.

In a calcium lactobionate solution of 3% remain dissolved 9.56% of calcium gluconate.

In a calcium lactobionate solution of 4% remain dissolved 9.66% of calcium gluconate.

In a calcium lactobionate solution of 5% remain dissolved 9.71% of calcium gluconate.

After 25 days the solutions contained the following quantities of calcium gluconate:

In a calcium lactobionate solution of 1% remain dissolved 5.54% of calcium gluconate.

In a calcium lactobionate solution of 2% remain dissolved 5.85% of calcium gluconate.

In a calcium lactobionate solution of 3% remain dissolved 6.40% of calcium gluconate.

In a calcium lactobionate solution of 4% remain dissolved 6.85% of calcium gluconate.

In a calcium lactobionate solution of 5% remain dissolved 8.80% of calcium gluconate.

These comparative tests clearly show the unexpected action of calcium lactobionate.

Therefore, by adding calcium salts of monocarboxylic acids deriving from polyaldoses to supersaturated aqueous calcium gluconate solutions the crystallization of the latter is extraordinarily retarded even in presence of crystals of calcium gluconate. Furthermore, stable calcium gluconate solutions of a much higher concentration can be obtained than it is possible according to the processes described in the above said copending applications.

The present process provides, therefore, a method for the preparation of stable supersaturated calcium gluconate solutions and consists in the preparation of hot concentrated calcium gluconate solutions containing suitable amounts of calcium salts of monocarboxylic acids derived from polyaldoses. Such solutions can further be subjected to a repeated heating operation in closed containers.

The present process may be carried out in the following way, the parts being by weight.

100 parts of pure calcium gluconate and 50 parts of calcium lactobionate are dissolved in 1000 parts of hot water, filtered through a sterile filter and the solution obtained is filled into suitable containers which are adapted to be hermetically closed. The supersaturated solutions prepared in this way are perfectly stable and clear. The salts therein dissolved do not crystallize out even on long vigorous shaking.

The quantity of calcium lactobionate or of calcium maltobionate used in this example may be varied within wide limits without producing a salting out action on the dissolved calcium gluconate. It is also possible to prepare more concentrated solutions of calcium gluconate e. g. up to 25% and to stabilize them in the manner above described.

The sterile stable supersaturated solutions prepared in this way may be used for the purposes described in the above said copending applications and represent very useful therapeutical preparations capable of being used for intramuscular injections without irritation of the tissues.

What we claim is:—

1. As a new composition of matter, clear, stable, sterile and supersaturated aqueous calcium gluconate solutions containing 4–25% of calcium gluconate and 0.5–25% of calcium salts of monocarboxylic acids derived from polyaldoses, which do not crystallize even during a long storage and which possess excellent therapeutical properties and may be used for intramuscular injections without irritation of the tissues.

2. As a new composition of matter, clear, stable, sterile and supersaturated aqueous calcium gluconate solutions containing 4–25% of calcium gluconate and 0.5–25% of calcium lactobionate, which do not crystallize even during a long storage and which possess excellent therapeutical properties and may be used for intramuscular injections without irritation of the tissues.

ARTHUR STOLL.
ERNST BURCKHARDT.